United States Patent
Rau et al.

(10) Patent No.: US 6,974,012 B2
(45) Date of Patent: Dec. 13, 2005

(54) SLIDING COLLAR PRODUCED BY POWDER METALLURGY

(75) Inventors: Günter Rau, Füssen (DE); Lorenz Sigl, Lechaschau (AT); Thomas Kalchschmid, Marktoberdorf (DE)

(73) Assignee: Sinterstahl GmbH, Fuessen (DE)

( * ) Notice: Subject to any disclaimer, the term of this patent is extended or adjusted under 35 U.S.C. 154(b) by 0 days.

(21) Appl. No.: 10/683,722

(22) Filed: Oct. 10, 2003

(65) Prior Publication Data

US 2004/0079611 A1  Apr. 29, 2004

(30) Foreign Application Priority Data

Oct. 10, 2002  (DE) ................ 102 47 330

(51) Int. Cl.⁷ .............................................. F16D 23/04
(52) U.S. Cl. .................. 192/108; 29/893.3; 29/893.33
(58) Field of Search ............................ 192/108, 107 R, 192/53.4, 53.1, 69.9, 69.91, 69.7; 74/339, 74/457; 419/26; 29/893.33, 893.34, 893.3; 403/359.6

(56) References Cited

U.S. PATENT DOCUMENTS

| | | | |
|---|---|---|---|
| 2,565,214 A | 8/1951 | Flinn | |
| 5,096,037 A * | 3/1992 | Knoess et al. | 192/108 |
| 5,701,574 A * | 12/1997 | Derflinger et al. | 419/26 |
| 6,168,754 B1 * | 1/2001 | Woolf et al. | 29/893.34 |
| 6,244,413 B1 | 6/2001 | Gutmann et al. | |
| 6,370,979 B1 | 4/2002 | Tauschek et al. | |
| 6,626,277 B2 * | 9/2003 | Hauf | 192/53.1 |
| 2003/0183479 A1 * | 10/2003 | Rau et al. | 192/108 |

FOREIGN PATENT DOCUMENTS

| | | |
|---|---|---|
| AT | 409 234 B | 11/2001 |
| DE | 197 11 971 A1 | 9/1998 |
| DE | 197 41 613 C1 | 3/1999 |

* cited by examiner

Primary Examiner—Rodney H. Bonck
(74) Attorney, Agent, or Firm—Laurence A. Greenberg; Werner H. Stemer; Ralph E. Locher

(57) ABSTRACT

A sliding collar has claw internal toothing and teeth projecting from at least one of the end surfaces. The individual teeth have lateral surfaces configured as lateral surfaces of a cone segment or as lateral surfaces of a cone segment and one or more truncated-cone segments. The novel geometry of the lateral surfaces which extend outward from the root circle results in both manufacturing technology and functional advantages over sliding collars with known tooth geometries.

6 Claims, 4 Drawing Sheets

SLIDING COLLAR PRODUCED BY POWDER METALLURGY

BACKGROUND OF THE INVENTION

Field of the Invention

The invention relates to a sliding collar produced by powder metallurgy for a synchronizing device of a manual transmission. The device comprises a collar body with claw internal toothing, end faces and with teeth that project at least above an end face and have roof ridges, roof slopes and lateral surfaces. The roof ridges and roof slopes extend radially outward to at most the root circle.

Sliding collars, which are often also referred to as sliding sleeves, are needed to change gear in manual transmissions, in particular in motor vehicle manually actuated transmissions. The shifting operation produces a force-locking, i.e., non-positive connection between the transmission main shaft and the corresponding gearwheel. Annular sliding collars or sliding sleeves are axially delimited by in each case one end face and in the interior of the ring have a claw toothing, via which the sliding sleeve is non-positively connected to the coupling body of the gearwheel after the gear shift operation has ended. In functional terms, the end-side regions of the teeth have to be configured in such a way that the axial meshing of synchronizer ring and sliding sleeve takes place without disruption and easily during the gear shift operation. Accordingly, the shape of the end-side region of a tooth of the sliding sleeve in the region which lies on the radially inner side with respect to the tooth root circle is predetermined in design terms. In the case of sliding sleeves, it is also customary for only this end-side tooth region to be of specific configuration, i.e. this end-side tooth region is geometrically distinct from the otherwise planar end-side surface of the sliding collar.

Until a few years ago, sliding collars were formed from forged round steel blanks or steel rings by way of complex machining processes. Recently, sliding collars of this type have also been produced as sintered shaped parts by means of powder metallurgy processes. In this case, the predetermined geometric design of the end-side tooth regions imposes high demands on the pressing technology used, and these demands have not hitherto been sufficiently satisfied. The known technical realizations in each case entail considerable compromises.

Transmission components and in particular toothing components are required to have a sufficiently high resistance to fatigue and Hertz contact pressure.

Besides the hardness and further microstructural properties, the residual porosity has a crucial influence. It is endeavored to establish an advantageously low residual porosity simply as a result of a high density of the pressed shaped part with moderate sintering shrinkage, since a high level of sintering shrinkage makes it difficult to achieve tight tolerances.

This sufficiently high pressed density in the end-side tooth edge regions, which are critical with regard to pressing technology used, is only achieved when a high pressing pressure is applied, which in turn leads to very high surface pressure in exposed regions of the press ram and to the premature failure of press rams of this type.

In the case of sliding collars which are subject to high loads, a sufficiently high fatigue strength can only be achieved if the specific density in edge regions of the teeth which lie close to the surface is over 7.2 g/cm$^3$. This requires selective recompression of the tooth flanks by a second pressing operation which follows the sintering operation. The core density may be slightly lower than the surface density. However, a sufficient bending strength and rigidity has to be ensured in the region of the tooth base and a high rolling strength has to be ensured in the region of the tooth tips and tooth flanks (Hertz contact pressure).

Austrian patent AT 409 234 B (application No. A 1734/2000) describes a sintered sliding collar of the type described in the introduction which, according to the object, is supposed to avoid the unacceptably high pressure for known tooth geometries and high mechanical load on the press tool and at the same time is to allow structural forms of press ram without ultrafine ram regions in the press tool.

This is achieved via the configuration of the teeth, which project above the end faces of the collar body by an axial extent of the roof slopes or tooth flanks in roof form and in the region of this projection, along a distance or height which is extended radially outward beyond the root circle, have a roof slope which continues over this height.

The tooth geometry of the collar described in the Austrian patent, on account of the low fracture toughness of the materials which are customarily used for press tools, if a sufficiently long service life is to be ensured, does not allow the use of a sufficiently high pressing pressure, and consequently the pressed parts do not have a sufficiently high density in all zones. An insufficient density in local regions is therefore present even after the sintering operation. Therefore, selective further compression of the end-side teeth is required after the sintering process. The large area which requires further compression and the insufficient ability to surround the teeth by the press tool during the further compression, mean that the increase in density in the tooth region is insufficient. This has unfavorable effects both on the fatigue properties and on static strength properties. Moreover, the tooth shape described in AT 409 234 B (A 1734/2000) has drawbacks in terms of fluid dynamics. The sliding collar is surrounded by gear oil. On account of the fact that the tooth is shaped as a bucket wheel, the rotation resistance is also increased on account of an increased flow resistance.

Furthermore, sliding collars in accordance with AT 409 234 B, if they have teeth with continuous roof slopes, lack a suitable reference surface, as is extremely desirable and advantageous in particular for the various machining steps used during production of the collars. A further drawback is the unprotected position of the teeth projecting on the end side, with the result that the teeth can be damaged both in the pressed state, in the pressed/sintered state and in the pressed/sintered and further-compressed state.

SUMMARY OF THE INVENTION

It is accordingly an object of the invention to provide a sliding collar, which overcomes the above-mentioned disadvantages of the heretofore-known devices and methods of this general type and which proposes a configuration of the end-side edge regions of a claw internal toothing that makes it possible to construct press rams without areas of the ram which are at risk of breaking. At the same time, the sliding collar is to have a geometry which allows both powder pressing without disadvantageously high pressing pressures yet the powder compressed to substantially the same extent, and also allows the sintered body to be compressed further as effectively as possible.

With the foregoing and other objects in view there is provided, in accordance with the invention, a sliding collar for a synchronizing device of a manual transmission and produced by powder metallurgy. The novel sliding collar comprises:

a collar body formed with claw internal toothing defining a root circle, end faces, and a plurality of teeth projecting above at least one of the end faces;

the teeth having roof ridges and roof slopes extending radially outward to at most the root circle; and the teeth having lateral surfaces formed of a cone segment or formed of a cone segment and one or more truncated-cone segments.

In other words, the objects of the invention are achieved for a sliding collar by virtue of the fact that the tooth lateral surfaces are designed as lateral surfaces of a cone segment or as lateral surfaces of a cone segment and one or more truncated-cone segments. These cone or truncated-cone segments may have both circle and ellipse segments as their base surfaces. The internal angle $\beta$ in the radial direction between roof ridge and adjoining cone segment is preferably $(\alpha/2+70°) \leq \beta \leq (\alpha/2+110°)$, where $\alpha$ is the tooth tip angle included by the roof slopes.

A particularly advantageous embodiment of the sliding collar consists in spacers, which project beyond the tooth roof ridges in the axial direction or are at least of the same height as these ridges, being formed on at least one side in the region of the end face.

A further advantageous embodiment of the present invention consists in the teeth being pressed and sintered with an oversize and only being pressed to the desired size during the further compression, with the shape of the pressing or further compression tools being such that the tooth tip angle is increased by 5 to 25° by the further compression operation. Furthermore, it is advantageous if at least regions of the roof slopes curve outward.

The present invention has a number of significant advantages compared to the closest prior art, as described in the introductory text above.

Unlike in the prior art, during the formation of the tooth lateral surfaces in accordance with the invention, the mechanical stresses which occur in the press tool are relatively low. This significantly reduces the risk of the press ram breaking.

Furthermore, the inventive configuration of the tooth lateral surfaces makes it possible for the tooth to be radially surrounded by a suitably configured tool during the further compression operation. This leads to a considerably reduced porosity and to an improvement in the mechanical properties.

According to an advantageous embodiment of the invention, the tooth tip angle in the further-compressed state is larger than that of the body which has only been sintered. If the further compression is carried out in such a way that the compression operation applies only to the upper region of the tooth, a stepped roof slope is formed. This has favorable effects on the transmission gear shift properties. An additional improvement to the transmission gear shift properties is achieved if the roof slopes curve outward.

The configuration of the end face adjacent to the tooth lateral surfaces creates a reference plane which very significantly simplifies handling of the sliding collars during the further machining, in particular also for the formation of the undercuts in the internal toothing in order to prevent the teeth from being pulled out.

If—according to a further advantageous embodiment of the invention—spacers which project beyond the tooth roof ridges in the axial direction or at least are of the same height are formed, the tooth functional surfaces are protected and the unsintered collar body can be handled significantly more easily and at lower cost during production.

Sliding collars are in very widespread use for manually actuated transmissions. A preferred application area is motor vehicle manual transmissions. However, their possible uses also encompass machine tools and mechanical conveying and/or local transport devices.

Other features which are considered as characteristic for the invention are set forth in the appended claims.

Although the invention is illustrated and described herein as embodied in a sliding collar produced by powder metallurgy, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 2:
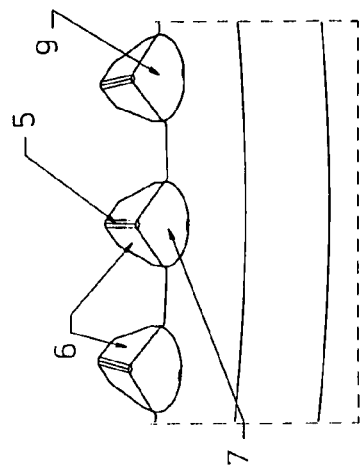
FIG. 2 is a perspective view of a section of the ring from FIG. 1.
Figure 1:
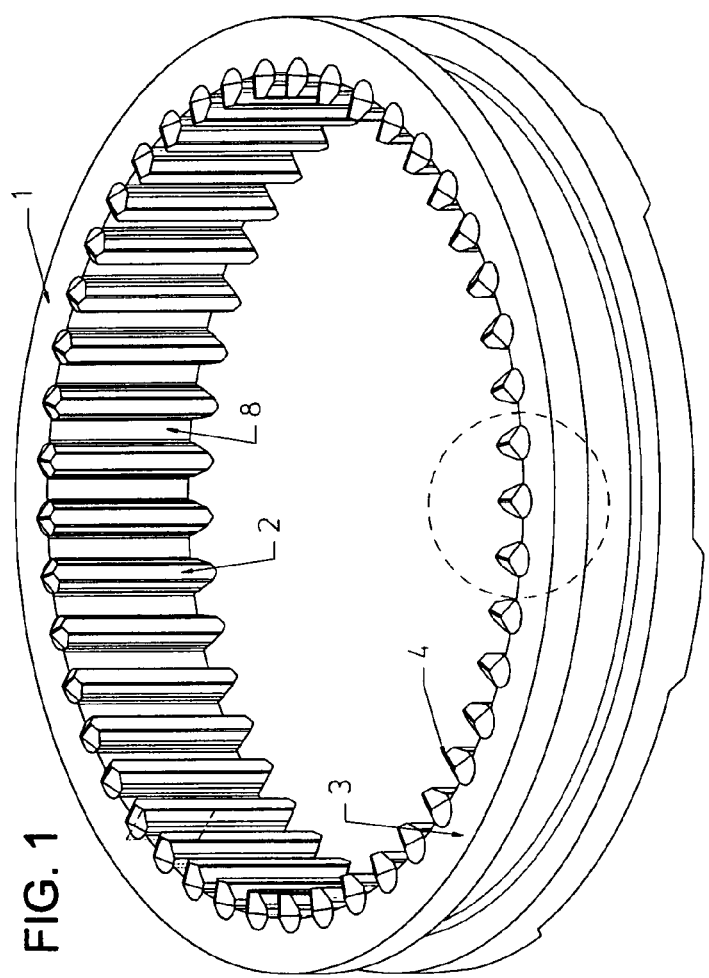
FIG. 1 is a perspective view of a sliding collar according to the invention.
Figure 4:
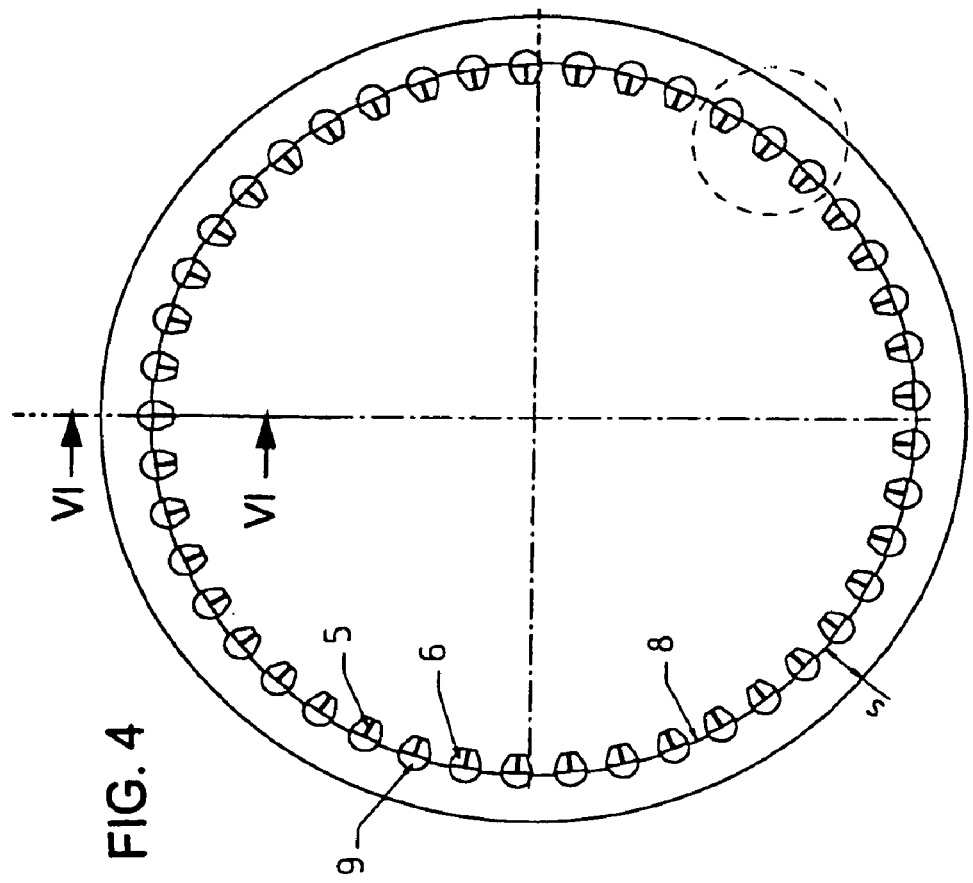
FIG. 4 is an end view of the sliding collar of FIG. 1.

Referring now to the figures of the drawing in detail and first, particularly, to FIG. 1 thereof, there is shown a sliding collar with collar body 1, claw internal toothing 2, end faces 3 and teeth 4 which project at the end sides. Roof ridges 5, roof slopes 6 and the configuration of the side surfaces or lateral surfaces 7 of the end-side teeth which is crucial to the invention can be seen from FIG. 2 and FIG. 3.

Figure 3:
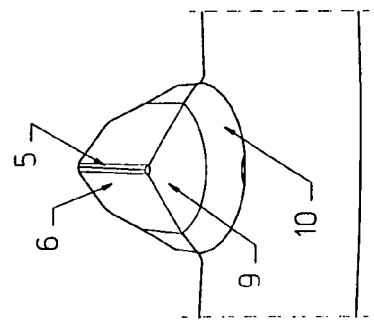
FIG. 3 is a perspective view of a further section of the ring in accordance with the invention.
Figure 6:
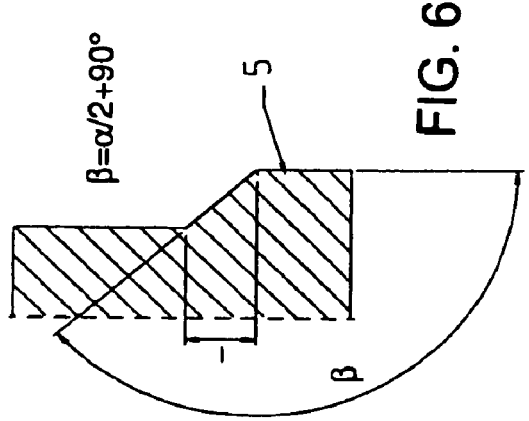
FIG. 6 is a section taken along the line VI—VI in FIG. 4.

The lateral surfaces 7 are in this case designed as lateral surfaces of a cone segment 9 (cf. FIG. 2) or of a cone segment 9 and truncated-cone segment 10 (cf. FIG. 3). The base surface of the cone segment 9 or the truncated-cone segment 10 in each case forms a segment of a circle. The internal angle in the radial direction between the roof ridge 5 and the adjoining lateral surface of the cone segment 9 is denoted by $\beta$ and in this example is precisely $\alpha/2+90°$ (cf. FIG. 6). The angle $\alpha$ is the tooth tip angle included by the roof slopes.

Figure 5:
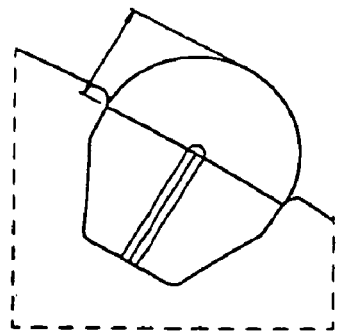
FIG. 5 is an end view of a tooth from FIG. 4.
Figure 8:
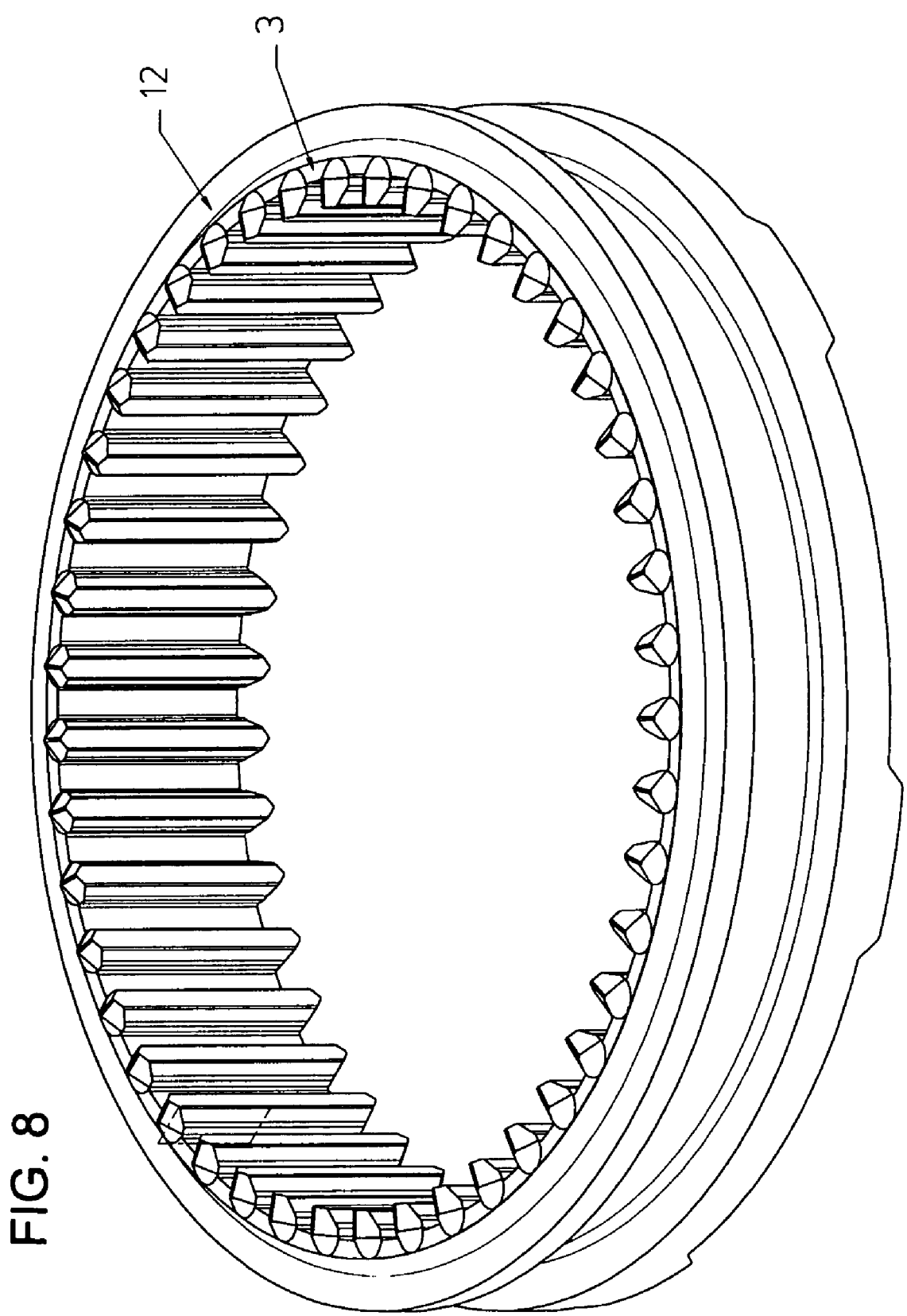
FIG. 8 is a perspective view of a sliding collar according to the invention with a stepped end face.

The tooth depth of the individual teeth 4 is delimited by a root circle 8. The outwardly extending surfaces 12 are planar (FIG. 1) or stepped (FIG. 8) in dependence on the requirements of the specific application. The projected length in plan view in the radial direction as an extension of the roof ridge, which is denoted by 1 in FIG. 5, is selected to be such that the reference surface has a sufficient width from both a manufacturing technology point of view and functional aspects.

Figure 7:
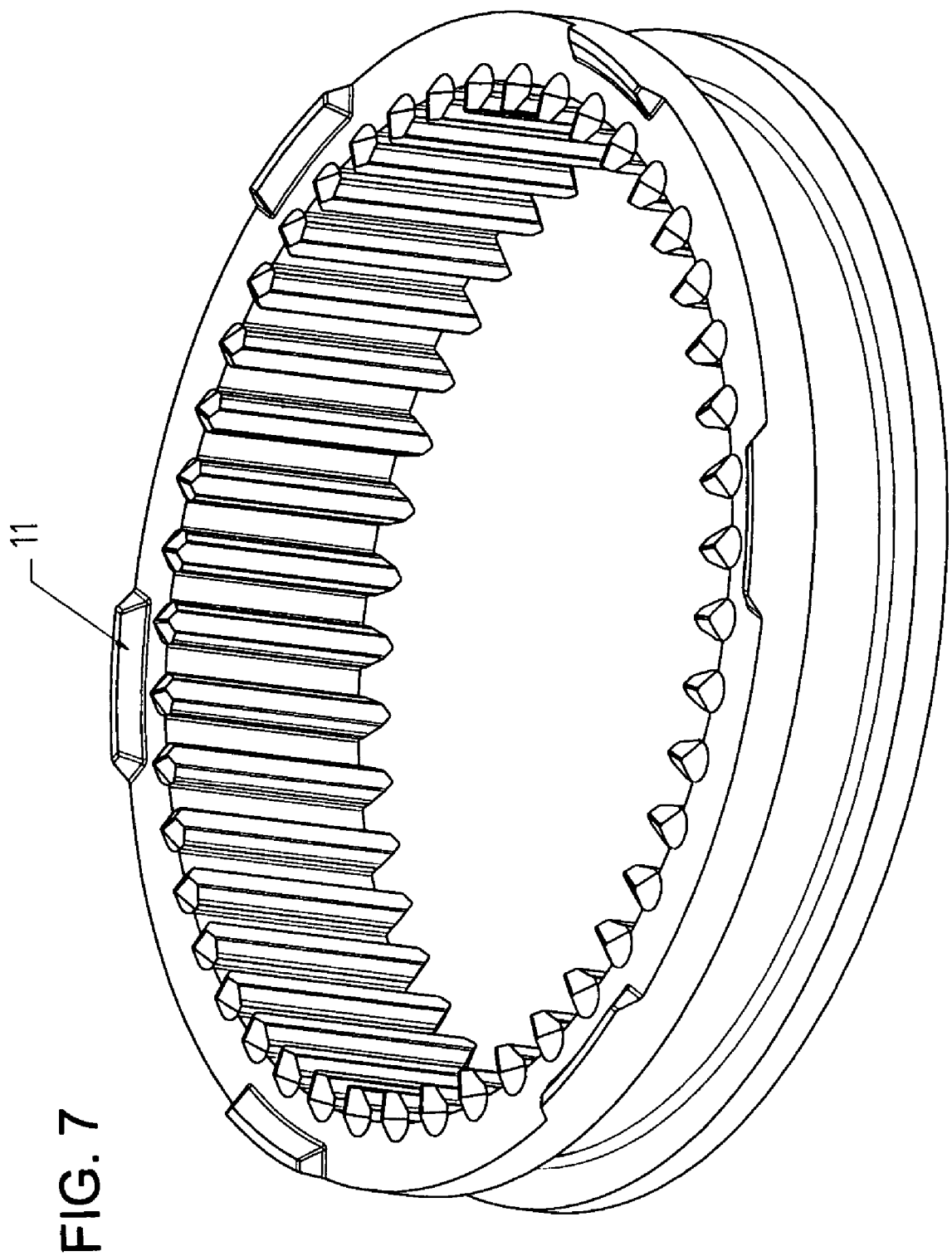
FIG. 7 is a perspective view of a sliding collar according to the invention with the advantageous configuration described in claim 5.

FIG. 7 illustrates, by way of example, a spacer 11 which projects above the roof ridges 5. It will be understood, however, that other geometric configurations which comply with powder metallurgy design rules are also possible for this spacer.

We claim:

1. A sliding collar produced by powder metallurgy for a synchronizing device of a manual transmission, the sliding collar comprising:
    a collar body formed with claw internal toothing defining a root circle, end faces, and a plurality of teeth projecting above at least one of said end faces;
    said teeth having roof ridges and roof slopes extending radially outward to at most said root circle; and
    said teeth having lateral surfaces formed of a cone segment or formed of a cone segment and one or more truncated-cone segments.

2. The sliding collar according to claim 1, wherein said cone segments have circular segment or elliptical segment base surfaces.

3. The sliding collar according to claim 1, wherein said cone segments and said truncated-cone segments have circular segment or elliptical segment base surfaces.

4. The sliding collar according to claim 1, wherein each of said roof ridges and a respectively adjoining lateral surface include an internal angle $\beta$ in a radial direction, said roof slopes of said teeth define a tip angle $\alpha$, and wherein the angle $\alpha$ and the angle $\beta$ satisfy the following relationship:

$$(\alpha/2+70°) \leq \beta \leq (\alpha/2+110°).$$

5. The sliding dollar according to claim 1, which further comprises spacers formed on said at least one end face and having a height, in an axial direction of said sliding collar body, at least as great as a height of said roof ridges.

6. A method of producing a sliding collar, which comprises:
    performing a plurality of powder metallurgy process steps including pressing, wintering, and further compression, to form the sliding collar according to claim 1; and
    thereby pressing and sintering the teeth with an oversize and having a tip angle $\alpha_1$ included by the roof slopes; and subsequently forming the teeth to a desired dimension with the tip angle $\alpha$ during the further compression, with $\alpha_1$ and $\alpha$ satisfying the relationship $(\alpha_1+5°) < \alpha < (\alpha_1+25°)$.

* * * * *